US011811820B2

(12) United States Patent
Meshi et al.

(10) Patent No.: US 11,811,820 B2
(45) Date of Patent: Nov. 7, 2023

(54) MALICIOUS C AND C CHANNEL TO FIXED IP DETECTION

(71) Applicant: PALO ALTO NETWORKS (ISRAEL ANALYTICS) LTD., Tel Aviv (IL)

(72) Inventors: Yinnon Meshi, Kibbutz Revivim (IL); Idan Amit, Ramat Gan (IL); Jonathan Allon, Haifa (IL); Aviad Meyer, Hod-Hasharon (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 179 days.

(21) Appl. No.: 16/798,466

(22) Filed: Feb. 24, 2020

(65) Prior Publication Data

US 2021/0266331 A1 Aug. 26, 2021

(51) Int. Cl.
*G06F 21/00* (2013.01)
*H04L 9/40* (2022.01)

(52) U.S. Cl.
CPC ........ *H04L 63/145* (2013.01); *H04L 63/0209* (2013.01); *H04L 63/0263* (2013.01); *H04L 63/1425* (2013.01)

(58) Field of Classification Search
CPC ............... H04L 63/145; H04L 63/0263; H04L 63/1425; H04L 63/0209
See application file for complete search history.

(56) References Cited

U.S. PATENT DOCUMENTS

| | | |
|---|---|---|
| 8,245,304 B1 | 8/2012 | Chen et al. |
| 8,555,388 B1 | 10/2013 | Wang et al. |
| 8,561,188 B1 | 10/2013 | Wang et al. |
| 8,677,487 B2 | 3/2014 | Balupari et al. |
| 8,826,434 B2 | 9/2014 | Merza |
| 8,966,625 B1 | 2/2015 | Zuk |
| 9,038,178 B1 | 5/2015 | Lin et al. |

(Continued)

OTHER PUBLICATIONS

Wei et al., "Identifying New Spam Domains by Hosting IPS: Improving Domain Blacklisting", Dept, of Computer and Information Sciences, University of Alabama at Birmingham, pp. 1-8, Jan. 2010.

(Continued)

*Primary Examiner* — Michael M Lee
(74) *Attorney, Agent, or Firm* — KLIGLER & ASSOCIATES PATENT ATTORNEYS LTD

(57) ABSTRACT

Methods, apparatus and computer software products implement embodiments of the present invention that include protecting a computer system, by collecting information from data traffic transmitted between multiple local nodes on a private data network and public IP addresses corresponding to multiple remote nodes on a public data network. DNS resolutions are detected in the collected information, each DNS resolution identifying a local node requesting the resolution with respect to a URI and a public IP address corresponding to the URI. Transmissions from the local nodes to the public IP addresses are detected in the collected information at respective times, and the detected DNS resolutions are compared to the detected transmissions so as to identify the transmissions from the local notes to the public IP addresses that were not resolved by the DNS resolutions. Finally, a protective action is initiated with respect to at least some of the identified transmissions.

31 Claims, 5 Drawing Sheets

(56) References Cited

U.S. PATENT DOCUMENTS

| | | | |
|---|---|---|---|
| 9,130,982 B2* | 9/2015 | Gottlieb | H04L 63/1416 |
| 9,147,071 B2 | 9/2015 | Sallam | |
| 9,154,516 B1 | 10/2015 | Vaystikh et al. | |
| 9,215,239 B1 | 12/2015 | Wang et al. | |
| 9,342,691 B2 | 5/2016 | Maestas | |
| 9,378,361 B1 | 6/2016 | Yen et al. | |
| 9,386,028 B2 | 7/2016 | Altman | |
| 9,462,008 B2 | 10/2016 | Bartos et al. | |
| 10,148,690 B2 | 12/2018 | Shen et al. | |
| 10,257,295 B1* | 4/2019 | Alpert | H04L 63/1425 |
| 10,425,436 B2 | 9/2019 | Firstenberg et al. | |
| 10,601,866 B2 | 3/2020 | Bartik et al. | |
| 10,574,681 B2 | 12/2020 | Meshi et al. | |
| 2003/0110379 A1* | 6/2003 | Ylonen | H04L 63/0263 713/164 |
| 2007/0064617 A1* | 3/2007 | Reves | H04L 63/1408 370/252 |
| 2007/0143852 A1* | 6/2007 | Keanini | H04L 63/1433 726/25 |
| 2008/0082662 A1* | 4/2008 | Dandliker | H04L 63/10 709/225 |
| 2008/0256622 A1 | 10/2008 | Neystadt et al. | |
| 2009/0119397 A1* | 5/2009 | Neerdaels | H04L 29/12594 709/223 |
| 2011/0016525 A1* | 1/2011 | Jeong | H04L 63/1425 726/23 |
| 2011/0239300 A1 | 9/2011 | Klein et al. | |
| 2011/0283357 A1 | 11/2011 | Pandrangi et al. | |
| 2011/0302656 A1* | 12/2011 | El-Moussa | H04L 63/1416 726/24 |
| 2012/0158626 A1 | 6/2012 | Zhu et al. | |
| 2013/0007233 A1* | 1/2013 | Lv | H04L 61/2038 709/222 |
| 2013/0031625 A1 | 1/2013 | Lim | |
| 2014/0007238 A1 | 1/2014 | Magee et al. | |
| 2014/0165207 A1 | 6/2014 | Engel et al. | |
| 2015/0128263 A1 | 5/2015 | Raugas et al. | |
| 2015/0170072 A1* | 6/2015 | Grant | H04L 67/2814 705/7.36 |
| 2015/0172300 A1 | 6/2015 | Cochenour | |
| 2015/0358344 A1 | 12/2015 | Mumcuoglu et al. | |
| 2015/0373039 A1 | 12/2015 | Wang | |
| 2015/0373043 A1 | 12/2015 | Wang et al. | |
| 2016/0042287 A1 | 2/2016 | Eldardiry et al. | |
| 2016/0057165 A1 | 2/2016 | Thakar et al. | |
| 2016/0099852 A1 | 4/2016 | Cook et al. | |
| 2016/0104203 A1* | 4/2016 | Roosenraad | G06Q 30/0269 705/14.66 |
| 2016/0134651 A1 | 5/2016 | Hu et al. | |
| 2016/0150004 A1 | 5/2016 | Hentunen | |
| 2016/0156655 A1 | 6/2016 | Lotem et al. | |
| 2016/0234167 A1 | 8/2016 | Engel et al. | |
| 2016/0294773 A1 | 10/2016 | Yu et al. | |
| 2016/0352772 A1 | 12/2016 | O'Connor | |
| 2016/0366159 A1* | 12/2016 | Chiba | H04L 63/1458 |
| 2017/0026398 A1 | 1/2017 | Mumcuoglu et al. | |
| 2017/0041333 A1 | 2/2017 | Mahjoub et al. | |
| 2017/0126718 A1 | 5/2017 | Baradaran et al. | |
| 2018/0013778 A1* | 1/2018 | Lim | H04L 63/101 |
| 2018/0069884 A1* | 3/2018 | Firstenberg | H04L 63/1425 |
| 2018/0139224 A1* | 5/2018 | Arnell | H04L 61/4511 |
| 2018/0288073 A1 | 10/2018 | Hopper | |
| 2018/0351930 A1* | 12/2018 | Kim | H04L 63/0209 |
| 2019/0007440 A1 | 1/2019 | Lavi et al. | |
| 2019/0081952 A1* | 3/2019 | Wood | H04L 63/1491 |
| 2019/0190931 A1* | 6/2019 | Levin | H04L 63/20 |
| 2019/0250911 A1 | 8/2019 | Lospinuso et al. | |
| 2019/0319981 A1 | 10/2019 | Meshi et al. | |
| 2019/0387005 A1* | 12/2019 | Zawoad | H04L 63/1425 |
| 2020/0007548 A1* | 1/2020 | Sanghavi | H04L 63/0209 |
| 2020/0014714 A1* | 1/2020 | Mortensen | H04L 63/1425 |
| 2020/0177625 A1* | 6/2020 | Rouvinen | H04L 63/1425 |
| 2020/0213333 A1* | 7/2020 | Deutschmann | H04L 63/1416 |
| 2021/0014198 A1* | 1/2021 | Amoudi | H04L 63/0236 |
| 2021/0136037 A1* | 5/2021 | Balasubramaniam | H04L 63/0263 |

OTHER PUBLICATIONS

Iana., "Autonomous System (AS) Numbers", 1 page, Jul. 29, 2016.

Gross et al., "FIRE: FInding Rogue nEtworks", Annual Conference on Computer Security Applications, pp. 1-10, Dec. 7 -11, 2009.

Frosch., "Mining DNS-related Data for Suspicious Features", Ruhr Universitat Bochum, Master's Thesis, pp. 1-88, Dec. 23, 2011.

Bilge et at., "Disclosure: Detecting Botnet Command and Control Servers Through Large-Scale NetFlow Analysis", Annual Conference on Computer Security Applications, pp. 1-10, Dec. 3-7, 2012.

Blum., "Combining Labeled and Unlabeled Data with Co-Training", Carnegie Mellon University, Research Showcase @ CMU, Computer Science Department, pp. 1-11, Jul. 1998.

Felegyhazi et al., "On the Potential of Proactive Domain Blacklisting", LEET'10 Proceedings of the 3rd USENIX Conference on Large-scale exploits and emergent threats, pp. 1-8, San Jose, USA, Apr. 27, 2010.

Konte et al., "ASwatch: An AS Reputation System to Expose Bulletproof Hosting ASes", SIGCOMM , pp. 625-638, Aug. 17-21, 2015.

Markowitz, N., "Bullet Proof Hosting: A Theoretical Model", Security Week, pp. 1-5, Jun. 29, 2010, downloaded from http://www.infosecisland.com/blogview/4487-Bullet-Proof-Hosting-A-Theoretical-Model.html.

Markowitz, N., "Patterns of Use and Abuse with IP Addresses", Security Week, pp. 1-4, Jul. 10, 2010, downloaded from http://infosecisland.com/blogview/5068-Patterns-of-Use-and-Abuse-with-IP-Addresses.html.

Goncharov,M., "Criminal Hideouts for Lease: Bulletproof Hosting Services", Forward-Looking Threat Research (FTR) Team, A TrendLabsSM Research Paper, pp. 1-28, Jul. 3, 2015.

Bilge at al., "Exposure: Finding Malicious Domains Using Passive DNS Analysis ", NDSS Symposium, pp. 1-17 Feb. 6-9, 17, 2011.

Xu et al., "We know it before you do: Predicting Malicious Domains", Virus Bulletin Conference, pp. 73-33, Sep. 2014.

Meyer et al., U.S. Appl. No. 16/789,442, filed Feb. 13, 2020.

U.S. Appl. No. 16/917,949 Office Action dated Mar. 21, 2022.

U.S. Appl. No. 16/789,442 Office Action dated Aug. 18, 2022.

* cited by examiner

MALICIOUS C AND C CHANNEL TO FIXED IP DETECTION

FIELD OF THE INVENTION

The present invention relates generally to computer security and networks, and particularly to detecting malicious command and control (C&C) channels to fixed Internet Protocol (IP) addresses.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for protecting a computing device, including collecting, by a processor, information from data traffic transmitted between multiple local nodes on a private data network and public Internet Protocol (IP) addresses corresponding to multiple remote nodes on a public data network, detecting, in the collected information, Domain Name System (DNS) resolutions, each DNS resolution identifying a local node requesting the resolution with respect to a uniform resource identifier (URI) and a public IP address corresponding to the URI, detecting, in the collected information, transmissions from the local nodes to the public IP addresses at respective times, comparing the detected DNS resolutions to the detected transmissions so as to identify the transmissions from the local nodes to the public IP addresses that were not resolved by the DNS resolutions, and initiating a protective action with respect to at least some of the identified transmissions.

In one embodiment, the method may also include analyzing the detected transmissions so as to identify a subnet of the public data network containing a subset of the public IP addresses that were not resolved by the DNS resolutions but belong to a demilitarized zone (DMZ) subnet associated with the private data network, and refraining from the protective action with respect to the transmissions to the public IP addresses in the identified subnet.

In another embodiment, the method may also include identifying a given IP address that belongs to an autonomous system reserved for internal use by an entity, and refraining from the protective action with respect to the transmissions to the identified given public IP addresses.

In an additional embodiment, the method may also include identifying a given IP address that belongs to a content delivery network, and refraining from the protective action with respect to the transmissions to the identified given public IP addresses.

In a further embodiment, the method may also include analyzing the detected transmissions so as to identify a given local node that pinged a given public IP address so as to determine a status of the corresponding remote node, and refraining from the protective action with respect to the transmissions to the given public IP addresses.

In a supplemental embodiment, the method may also include analyzing the detected transmissions so as to identify a given local node that scanned one or more ports on a given remote node so as to determine one or more respective statuses of services provided by the given remote node at the one or more ports, and refraining from the protective action with respect to the transmissions to a given public IP address corresponding to the given remote node.

In another embodiment, the method may also include computing, for a given public IP address, a count distinct local nodes that transmitted at least one given transmission to the given public IP address, comparing the determined count to a specified range, and refraining from the protective action with respect to the transmissions to the identified given public IP addresses upon detecting that the computed count is greater than a specified threshold.

In some embodiments, each given transmission to a given public IP address includes a destination port number on the corresponding remote node, and the method may include computing, for a given public IP address, a count of distinct destination port numbers in the transmissions to the given public IP address, comparing the computed count to a specified threshold, and refraining from the protective action with respect to the transmissions to the identified given public IP addresses upon detecting that the computed count is greater than the specified threshold.

In an additional embodiment, the method may also include computing, based on the times, a count of distinct days having at least one given transmission to a given public IP address, comparing the determined count to a specified threshold, and refraining from the protective action with respect to the transmissions to the identified given public IP addresses upon detecting that the computed count is less than the specified threshold.

In a further embodiment, the method may also include computing, based on the times, a first count of distinct days having at least one given transmission from a given local node to a given public IP address, computing a second count of days having at least one given transmission from the given local node during at least a specified number of distinct hours, computing a ratio of the first count to the second count, comparing the ratio to a threshold, and refraining from the protective action with respect to the transmissions to the identified given public IP addresses upon detecting that the ratio is less than the specified threshold.

In a supplemental embodiment, the method may also include computing, based on the times, a count of distinct hours having at least one given transmission to a given public IP address, comparing the determined count to a specified threshold, and refraining from the protective action with respect to the transmissions to the identified given public IP addresses upon detecting that the computed count is less than the specified threshold.

In another embodiment, the method may also include determining a protocol of a given transmission to a given public IP address, computing a total volume of data in the transmissions to the given public IP address, comparing the computed count to a specified threshold for the determined protocol, and refraining from the protective action with respect to the given transmission upon detecting that the computed volume is less than the specified threshold.

In an additional embodiment, the method may also include determining a protocol of a given transmission to a given public IP address, computing a count of the transmissions in a session including the given transmission, comparing the computed count to a specified threshold for the determined protocol, and refraining from the protective action with respect to the given transmission upon detecting that the computed count is less than the specified threshold.

In a further embodiment, the method may also include determining a protocol of a given transmission to a given public IP address, identifying the determined protocol in a specified list of non-periodic protocols, computing a count of the transmissions to the given public IP address and including the determined protocol, comparing the computed count to a specified range for the determined protocol, and refraining from the protective action with respect to the given transmission upon detecting that the computed count is within the specified range.

In a supplemental embodiment, the method may also include determining a destination port number of a given transmission, comparing the determined destination port number to specified list of port numbers, and refraining from the protective action with respect to the given transmission upon detecting that the determined destination port number is in the specified list.

In another embodiment, the method may also include determining a geo-location of a given destination IP address in a given transmission, computing a count of the transmissions to any of the destination IP addresses having the same geo-location, comparing the computed count to a specified threshold, and refraining from the protective action with respect to the given transmission upon detecting that the computed count is less than the specified threshold.

In an additional embodiment, the method may also include determining that a given destination IP address in a given transmission belongs to an autonomous system, computing a count of the transmissions to the given destination IP, comparing the computed count to a specified threshold, and refraining from the protective action with respect to the given transmission upon detecting that the computed count exceeds the specified threshold.

In a further embodiment, the method may also include determining that a given destination IP address in a given transmission belongs to an autonomous system, determining that the autonomous system is not bulletproof, and refraining from the protective action with respect to the given transmission.

In a supplemental embodiment, the method may also include determining a given destination IP address in a given transmission, identifying a subset of the transmissions to the given public IP address, identifying, based on the times, a most recent transmission in the subset, determining a date for the most recent transmission, comparing the date to a specified threshold date, and refraining from the protective action with respect to the given transmission upon detecting that the determined date is after the specified threshold date.

In some embodiments, a given transmission includes a given protocol, and the method may also include receiving, from a firewall, a notification from a firewall that the firewall recognizes the given protocol, and refraining from the protective action with respect to the given transmission.

In other embodiments, a given transmission includes a given protocol and a given destination port number, and the method may include comparing the destination port number to a list of valid destination port numbers for the given protocol, and refraining from the protective action with respect to the given transmission upon detecting the given destination port number in the list.

In additional embodiments, a given transmission includes a given public IP address, and the method may include determining a number of the public IP addresses hosted by a datacenter hosting the given IP address, and refraining from the protective action with respect to the given transmission upon detecting that the determined number is less than a specified threshold.

In further embodiments, each given transmission from a given local node to a given remote node includes a given protocol and a given destination port number, and the method may include comparing the destination port numbers in the given transmissions to a list of standard port numbers, computing a count of the compared destination port numbers that were not in the list, and refraining from the protective action with respect to the given transmissions upon detecting that the computed count exceeds a specified threshold.

In one embodiment, the method may also include determining that a given destination IP address in a given transmission belongs to an autonomous system, determining that the autonomous system is not rentable, and refraining from the protective action with respect to the given transmission.

In another embodiment, the method may also include determining that the given source node is a proxy server, and refraining from the protective action with respect to the given transmission.

In an additional embodiment, the method may also include identifying one or more of the local nodes as pingers, determining that all of the transmissions to a given destination IP address are from the identified local nodes, and refraining from the protective action with respect to any given transmission to the given destination IP address.

In a further embodiment, the method may also include determining that a given destination IP address in a given transmission corresponds to a mail server, and refraining from the protective action with respect to the given transmission.

In a supplemental embodiment, the method may also include detecting a first given transmission to a given public IP address, detecting a second given transmission to the given public IP address and whose protocol includes Simple Network Management Protocol, detecting a third given transmission to the given public IP address and whose protocol includes Internet Control Message Protocol, and refraining from the protective action with respect to the first given transmission.

There is additionally provided, in accordance with an embodiment of the present invention, an apparatus for protecting a computer system, including a network interface controller (NIC), and at least one processor configured to collect, via the NIC from data traffic transmitted over a private data network, information from data traffic transmitted between multiple local nodes on the private data network and public Internet Protocol (IP) addresses corresponding to multiple remote nodes on a public data network, to detect, in the collected information, Domain Name System (DNS) resolutions, each DNS resolution identifying a local node requesting the resolution with respect to a uniform resource identifier (URI) and a public IP address corresponding to the URI, to detect, in the collected information, transmissions from the local nodes to the public IP addresses at respective times, to compare the detected DNS resolutions to the detected transmissions so as to identify the transmissions from the local nodes to the public IP addresses that were not resolved by the DNS resolutions, and to initiate a protective action with respect to at least some of the identified transmissions.

There is further provided, in accordance with an embodiment of the present invention, a computer software product for protecting a computing system, the product including a non-transitory computer-readable medium, in which program instructions are stored, which instructions, when read by a computer, cause the computer to collect information from data traffic transmitted between multiple local nodes on a private data network and public Internet Protocol (IP) addresses corresponding to multiple remote nodes on a public data network, to detect, in the collected information, Domain Name System (DNS) resolutions, each DNS resolution identifying a local node requesting the resolution with respect to a uniform resource identifier (URI) and a public IP address corresponding to the URI, to detect, in the collected information, transmissions from the local nodes to the public IP addresses at respective times, to compare the detected DNS resolutions to the detected transmissions so as to identify the transmissions from the local nodes to the public IP addresses that were not resolved by the DNS resolutions, and to initiate a protective action with respect to at least some of the identified transmissions.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
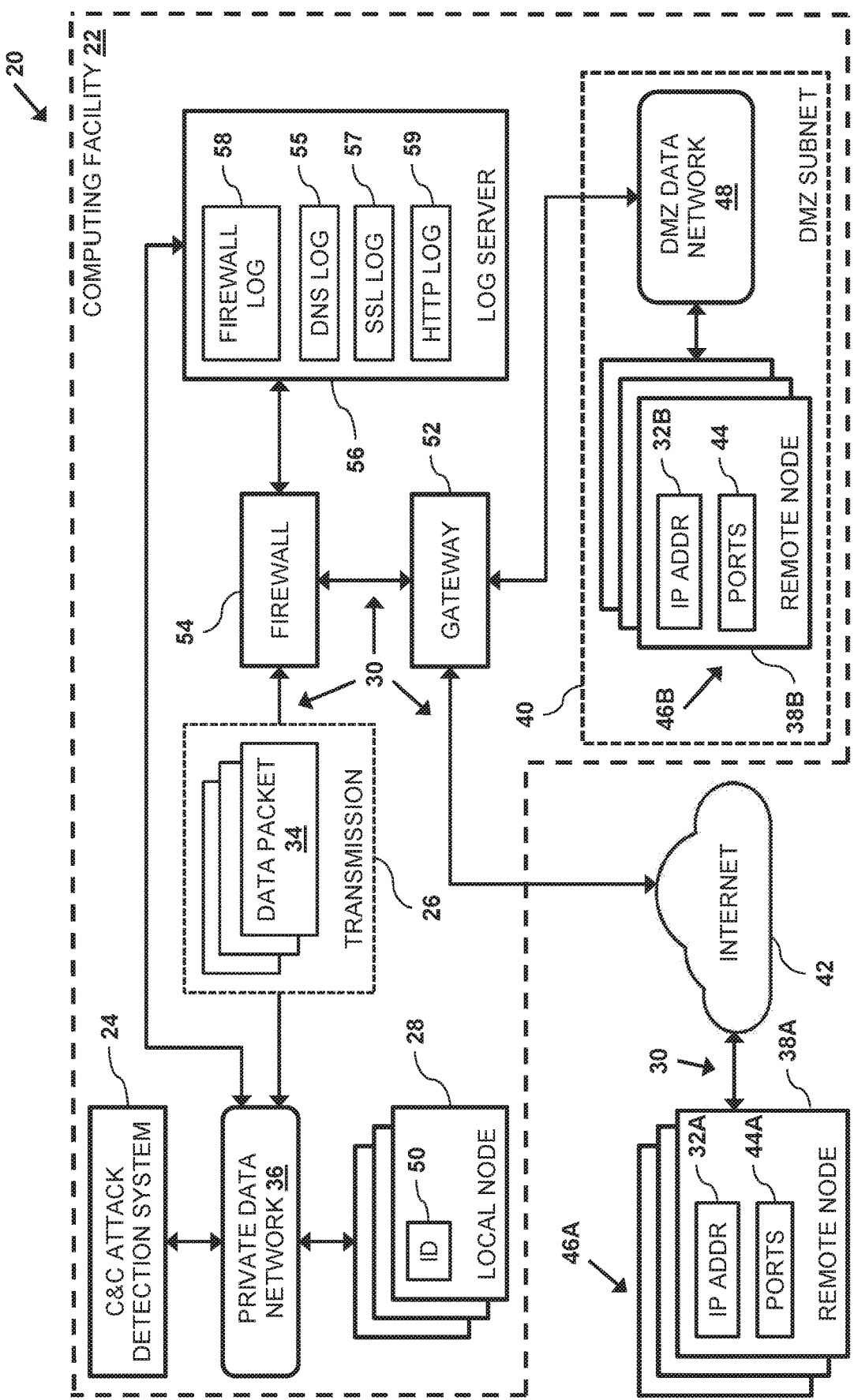
FIG. 1 is a block diagram that schematically shows a computing facility comprising a command and control (C&C) attack detection system and multiple local nodes that communicate with multiple remote nodes having corresponding public IP addresses, in accordance with an embodiment of the present invention.

Network security systems on private networks (e.g., corporate networks) typically limit or prevent remote computers from initiating connections to local computers on the private network. To overcome this limitation, an attacker may infect a given local computer with malware that opens a Command and Control (C&C) channel that can periodically contact the attacker from within the network, and upon being contacted, the attacker can respond (i.e., to the malware) with instructions or requests to exfiltrate sensitive data from the private network.

C&C channels are also used by legitimate services such as anti-virus system updates. For example, anti-virus software executing on a given local computer may periodically open a C&C channel to an external server (i.e., belonging to the anti-virus system vendor) to check if there are any software and/or database updates. However, while legitimate software that opens a C&C channel typically require a Domain Name System (DNS) resolution to obtain the public Internet Protocol (IP) address of the vendor's server, an increasing number of malware attacks using C&C channels have been found to contact fixed public IP addresses of external servers for attackers. In embodiments described herein, a public IP address is an IP address that can be accessed over a public data network such as the Internet.

Embodiments of the present invention provide methods and systems for detecting transmissions to fixed public IP addresses. As described hereinbelow, information is collected from data traffic transmitted between multiple local nodes on a private data network and multiple public Internet Protocol (IP) addresses corresponding to remote nodes on a public data network. Domain Name System (DNS) resolutions are detected in the collected information, each of the DNS resolutions identifying a given local node requesting the resolution with respect to a uniform resource identifier (URI) and a public IP address corresponding to the URI. Transmissions from the local nodes to the public IP addresses at respective times are also detected in the collected information, and the detected DNS resolutions are compared to the detected transmissions so as to identify the transmissions from the local nodes to the public IP addresses that were not resolved by the DNS resolutions. In embodiments of the present invention, a protective action is initiated with respect to at least some of the identified transmissions.

Systems implementing embodiments of the present invention can apply filters to the identified transmissions and/or analyze the identified transmissions so as to detect transmissions that are suspected of using C&C channels to fixed public IP addresses of servers belonging to attackers. As described hereinbelow, the transmissions can be analyzed to generate a whitelist of safe public IP addresses, and upon filtering out transmissions to the whitelisted public IP addresses, a set of rules can be applied to the remaining transmissions so as to detect and flag any suspected malicious transmissions.

System Description

FIG. 1 is a block diagram 20 that schematically shows an example of a computing facility 22 comprising a C&C attack detection system 24 that is configured to detect transmissions 26 suspected of using C&C channels 30 from local nodes (i.e., computing devices) 28 fixed public IP addresses 32, in accordance with an embodiment of the present invention. As described hereinbelow, each transmission 26 comprises one or more data packets 34 transmitted over a local data network 36 from a given local node 28 to a given public IP address 32.

In addition to computing facility 22, block diagram 20 also comprises multiple remote nodes 38 that are in a demilitarized zone (DMZ) subnet 40 or coupled to a public network 42 such as the Internet. For purposes of visual simplicity, FIG. 1 shows DMZ subnet 40 as a component of computing facility 22. In alternative embodiments, DMZ subnet 40 may comprise computing devices in a different computing facility or may simply comprise a range of IP addresses purchased from a vendor.

Each remote node 38 comprises one or more public IP addresses 32 and a set of communication ports 44. Ports 44 are logical entities that are defined by a communications protocol such as Transmission Control Protocol/Internet Protocol (TCP/IP). In some embodiments, each given IP address 32 may have one or more domains (i.e., domain names) 46 associated with the given IP address, and each given domain 46 may have one or more IP addresses 32 associated with the given domain. In other words, there is a many-to-many relationship between the domains and the IP addresses.

In FIG. 1, remote nodes 38 and their respective components (i.e., public IP addresses 32, ports 44 and domains 46) are differentiated by appending a letter to the identifying numeral, so that the remote nodes comprise remote nodes 38A that communicate with computing facility 22 via Internet 42, and remote nodes 38B (also referred to herein as DMZ nodes 38) that are coupled to a DMZ data network 48 that enables communication with the computing facility.

Each local node 28 may comprise any type of device (i.e., physical or virtual) that is configured to communicate over a private data network such as network 36, and has a local node identifier (ID) 50 assigned for this purpose. In embodiments described herein, network 36 comprises multiple subnets (not shown) that do not include any public IP address 32.

Examples of device IDs 50 include, but are not limited to, a media access control (MAC) addresses and local IP addresses that can be used to uniquely identify each local node 28. While any given time, each given local node 28 is assigned a unique local IP address, the given local node may be associated with multiple local IP addresses over an extended time period. For example, the local IP address for a given local node 28 may change after a reboot of the given local node.

In the configuration shown in FIG. 1, computing facility 22 may also comprise an Internet gateway 52 that couples networks 36 and 48 to Internet 42, and a firewall 54 that monitors and controls traffic (i.e., the flow of data packets 34) between those networks and the Internet based on predetermined security rules. For example, firewall 54 can be configured to allow local nodes to convey data requests to web sites hosted by remote nodes 38, and to block data requests from the web sites to the local nodes. In additional embodiments, firewall 54 may be configured to monitor and control traffic between local nodes 28.

In some embodiments, firewall 54 can be configured to group data packets 34 according to the IP addresses (i.e., IDs 50 and IP addresses 32) in the data packets, so that C&C attack detection system can group together the data packets having the same source and destination addresses or having the same source address (e.g., a given IP address 32 or a given ID 50), source port, destination address (e.g., a given IP address 32 or a given ID 50), destination port (e.g., a given port 44) and protocol. Methods of grouping data packets 34 into transmissions 26 are described, for example, in U.S. Patent Application 2019/0164086.

As shown in FIG. 1, computing facility 22 may also comprise a log server 56 that is coupled to firewall 54 and networks 36 and 48. Log server 56 is configured to receive details for each transmission 26, and to store the transmission details to a firewall log 58. In some embodiments, log server 56 can receive the transmission details from firewall 54 or from endpoint agents (not shown) executing on nodes 38. In operation, C&C attack detection system 24 can query firewall log 58, as described hereinbelow.

One example of a firewall 54 that can communicate with log server 56 is the PA-3250 Next Generation Firewalls produced by Palo Alto Networks, Inc. of 3000 Tannery Way, Santa Clara, Calif. 95054 USA. Some examples of information that the firewall can store to log 58 include:

customer_id: A unique ID for a customer (i.e., the entity managing the computing facility).
  receive_time: A time when the firewall received the log.
  time_generated: A time of a generated event (e.g., a given transmission 26).
  src: A source IP address in a given transmission 26.
  dst: A destination IP address in a given transmission 26.
  natsrc: A source MAC address in a given transmission 26.
  natdst: A destination MAC address in a given transmission 26.
  srcuser: A source username (if available) in a given transmission 26.
  dstuser: A destination username (if available) in a given transmission 26.
  app: An application ID for a software application (i.e., executing on a given local node 28) that originated a given transmission 26.
  sessionid: A unique ID for multiple packets 34 sent between two hosts in the same context.
  repeatcnt: A repeat count of a transmission of a given packet 34.
  sport: A source port in a given transmission 26.
  dport: A destination port in a given transmission 26.
  device_name: A device hostname (if it exists) in the packets of a given transmission 26.
  proto: A transmission protocol used (e.g., TCP, UDP or another low level protocol) in a given transmission 26.
  bytes_sent: A volume of traffic sent in a given transmission 26.
  bytes_received: A volume of traffic received in a given transmission 26. In embodiments described herein, volume indicates an amount of data (e.g., in kilobytes).
  pkts_sent: A number of sent packets 34 in a given transmission 26.
  pkts_received: A number of received packets 34 in a given transmission 26.
  category: A category for a given software application executing on a given local node 28 that originated a given transmission 26.
  elapsed: A duration of the transmission of packets 34 for a given software application that originated a given transmission 26.

In some embodiments, the firewall can also store, to log 58, deep packet inspection (DPI) information that can be used to detect, in a given transmission 26, features such as a Secure Sockets Layer (SSL) session, a hypertext transfer protocol (HTTP) request, and a domain name system (DNS) request.

For purposes of visual simplicity, the configuration shown in FIG. 1 shows log server 56 storing a DNS log 55, a SSL log 57 and a HTTP log 59. In another embodiment, log server 56 can store logs 55, 57 and 59 as separate tables in a database. The following are examples of information that log server 56 can store in logs 55, 57 and 59:

For each given transmission 26, logs 55, 57 and 59 can store information such as a source IP address, a destination IP address, a source media access control (MAC) address, a destination MAC address, a source port, a destination port and a time.
  For each given transmission 26, SSL log 57 can store information such as a transmitted volume, a received volume, a server name indication (SNI) and a server name.

For each given transmission 26, HTTP log 59 can store information such as a transmitted volume, a received volume, a uniform resource identifier (URI) and a server name.

For each given transmission 26, DNS log 55 can store information such as a requested domain and a resolved IP address.

Figure 2:
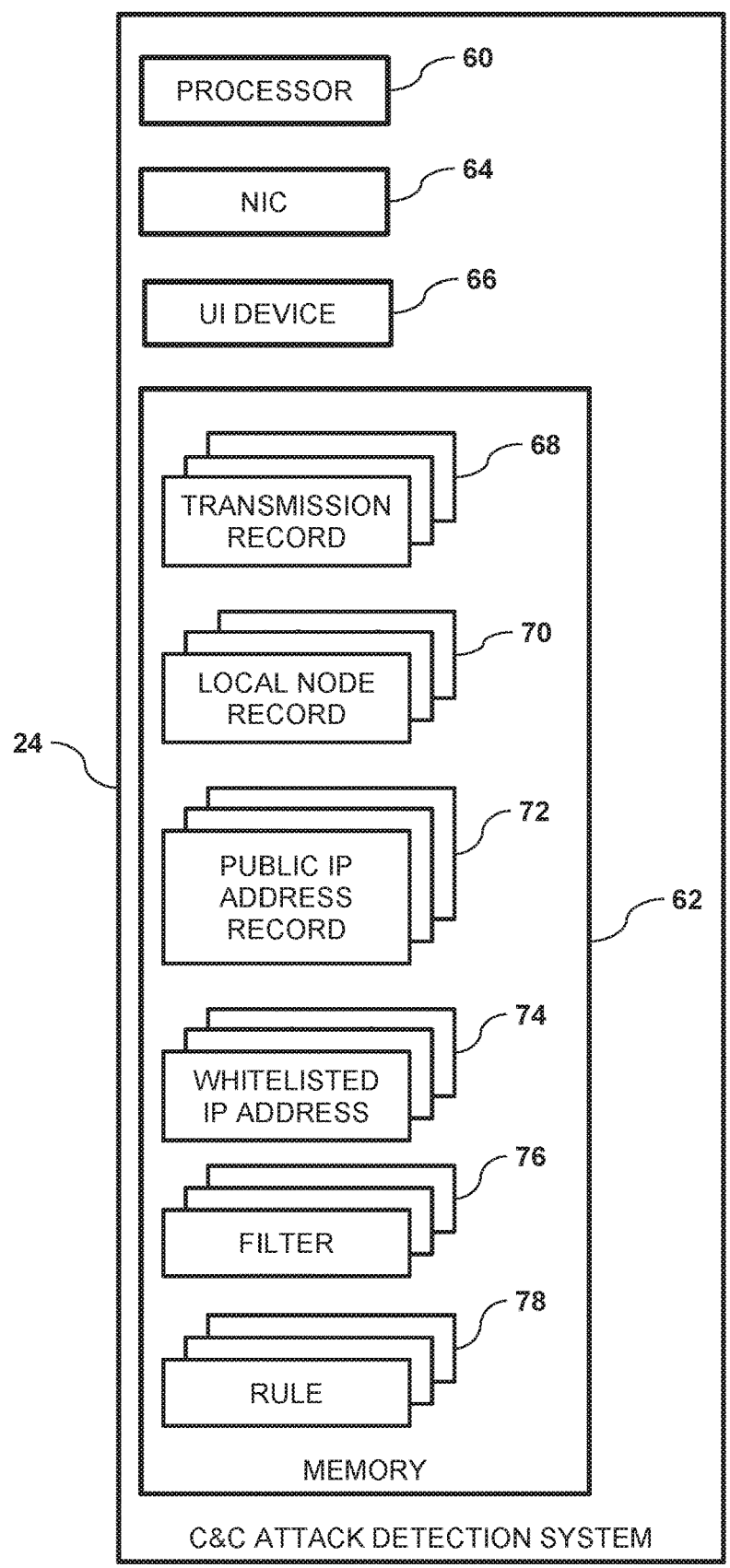
FIG. 2 is a block diagram of the C&C attack detection system that is configured to analyze data transmissions between the local and the public IP addresses, in accordance with an embodiment of the present invention.

FIG. 2 is a block diagram showing hardware and software components of C&C attack detection system 24, in accordance with an embodiment of the present invention. In some embodiments, C&C attack detection system 24 comprises a processor 60 and a memory 62, which are coupled by a system bus (not shown) to a network interface controller (NIC) 64 that couples the of DNS tunneling attack detection system to network 36. In some embodiments, C&C attack detection system 24 may comprise a user interface (UI) device 66 (e.g., an LED display) or another type of output interface.

In the configuration shown in FIG. 2, memory 62 stores respective pluralities of transmission records 68, local node records 70, public IP address records 72, whitelisted IP addresses 74, filters 76 and rules 78. Transmission records 68, local node records 70 and remote nodes 38 are described in the respective descriptions referencing FIGS. 3-5 hereinbelow. Filters 76 and Rules 78 are described respectively in Appendices 1 and 2 hereinbelow.

Processor 60 may comprise a general-purpose central processing unit (CPU) or one or more special-purpose embedded processors, which can be programmed in software or firmware to carry out the functions described herein. This software may be downloaded to C&C attack detection system 24 in electronic form, over a network, for example. Additionally or alternatively, the software may be stored on tangible, non-transitory computer-readable media, such as optical, magnetic, or electronic memory media. Further additionally or alternatively, at least some of the functions of processor 60 may be carried out by hard-wired or programmable digital logic circuits.

Memory 62 typically comprises dynamic random-access memory and/or non-volatile random-access memory. In some embodiments, the memory may comprise one or more non-volatile storage devices such as hard disk drives and solid-state disk drives.

In some embodiments, the functionality of C&C attack detection system 24 may be split among multiple devices within computing facility 22 or external to the computing facility (e.g., a data cloud based application). In additional embodiments, the functionality of C&C attack detection system 24 may be deployed in computing facility 22 as virtual machines.

Figure 3:
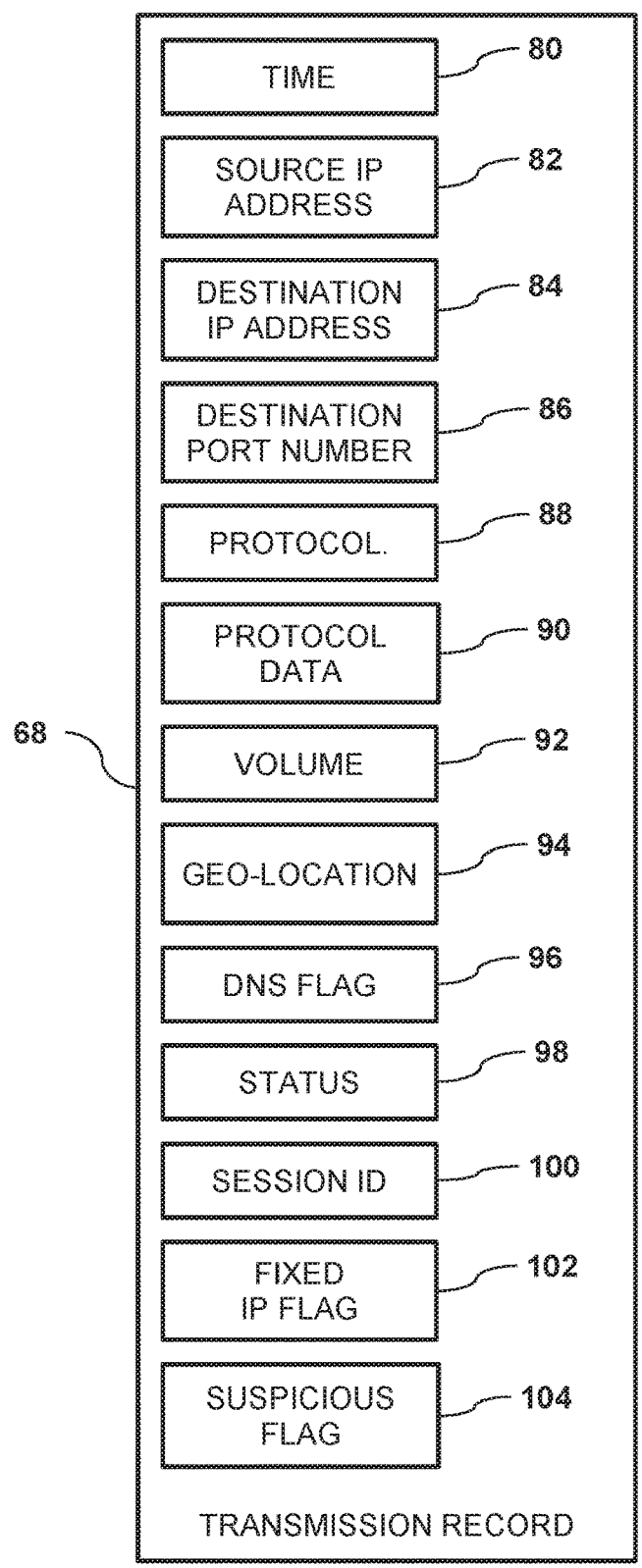
FIG. 3 is a block diagram showing an example of a transmission record that the C&C attack detection system can generate from each of the data transmissions, in accordance with an embodiment of the present invention.

FIG. 3 is a block diagram showing information for a given transmission 26 that processor 60 can extract from multiple data packets 34 and store to a given transmission record 68, in accordance with an embodiment of the present invention. Each given transmission record 68 corresponds to a given transmission 26 from a source (i.e., a given local node 28 or a given remote node 38) to a destination (likewise, a given local node 28 or a given remote node 38) and comprises information such as:

A time 80 indicating a date and time of the given transmission.

A source IP address 82. If the source of the given transmission is a given local node 28, then the source IP address comprises a local IP address. As described supra, the local ID for the given local node may comprise the local IP address. Identifying the local IP address for a given local node 28 is described in the description referencing FIG. 4 hereinbelow. If the source of the given transmission is a given remote node 38, then the source IP address comprises the public IP address for the given remote node.

A destination IP address 84. If the destination of the given transmission originated from a given local node 28, then the destination IP address comprises a local IP address. If the destination of the given transmission is a given remote node 38, then the destination IP address comprises the public IP address for the given remote node.

A destination port 86 indicating a given communications port on the destination (i.e., as indicated by the TCP 5-tuple for the given transmission). In embodiments described herein the destination for the given transmission may comprise a given local node 28 or a given remote node 46.

A protocol 88 for the given transmission. Examples of protocols 88 include, but are not limited to, HyperText Transfer Protocol (HTTP), HTTP Secure (HTTPS), Network Time Protocol (NTP), Simple Network Management Protocol (SNMP) and Secure Sockets Layer (SSL).

Additional protocol data 90. Examples of additional protocol data 90 include, but are not limited to, Server Name Indication (SNI), a certificate subject in a SSL handshake response and a host field when the protocol is HTTP.

A volume 92 indicating an amount of data conveyed in the given transmission.

A geo-location 94 indicating, when the destination comprises a given remote node 38, a geographic location of a given public IP address 32 for the given remote node 38. In some embodiments, processor 60 can determine the geographic locations from the destination IP addresses.

A DNS flag 96 indicating whether or not the given transmission comprises a DNS request or a DNS resolution.

A status 98 indicating whether or not the given transmission was received at the destination. In embodiments of the present invention, transmissions 26 typically use the TCP/IP communication protocol suite. In TCP/IP transmissions, processor 60 can determine status 98 based on ACK responses (or their absence).

A session ID 100. In some embodiments, processor 60 can aggregate multiple transmissions 26 into a single session, and the processor can assign a common session ID 100 to all of the transmissions in the session. In embodiments where transmissions 26 use the TCP/IP communications model, processor 60 can detect given communication session by detecting (a) a given local node 28 transmitting a "SYN" command to a given destination remote node 38, (b) the given remote node transmitting a "SYN-ACK" command to the given local node in response to receiving the "SYN" command, and (c) the given local node transmits an "ACK" command to the given remote node in response to receiving the "SYN-ACK" command.

A fixed IP flag 102 that indicates whether or not the given transmission was to a fixed public IP address, which processor 60 can determine using embodiments described in the description referencing FIG. 6 hereinbelow.

A suspicious flag 104 that indicates whether or not the given transmission is suspicious.

Figure 4:
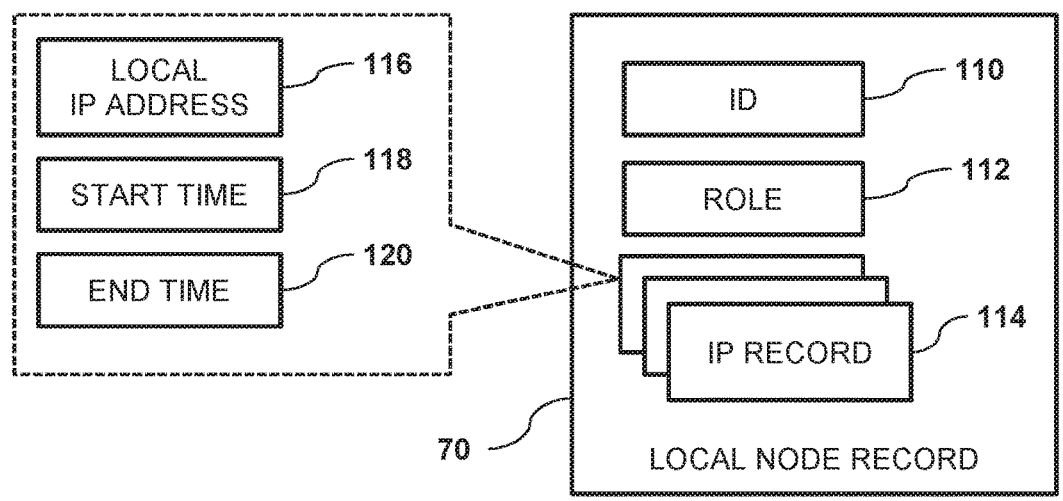
FIG. 4 is a block diagram showing an example of a local node record that the C&C attack detection system can generate for each of the local nodes, in accordance with an embodiment of the present invention.

FIG. 4 is a block diagram showing information for a given local node 28 that processor 60 can extract from transmissions 26 and store to a given local node record 70, in accordance with an embodiment of the present invention. Each given local node record 70 corresponds to a given local node 28, and comprises information such as:

An ID 110 that corresponds to a given local node ID 50.

A local node role 112. As described in Appendix 1 hereinbelow, processor 60 can determine role 112 for a given local node 28 by analyzing a series of transmissions 26 from the given local node to multiple remote nodes 38. Examples of local node roles 112 include, but are not limited to pingers, scanners and proxies/proxy servers.

One or more IP records 114, each of the IP records comprising a local IP address 116, a start time 118 and an end time 120. As described supra, the local IP address of a given local node 28 can change over time (e.g., after a reboot). Therefore, processor 60 can track the local IP addresses for each of the local nodes, populating data elements 116-120 in the IP records for the local nodes upon detecting changes in the local IP addresses, and use the data in the IP records to identify which local node 28 transmitted or received a given transmission 26.

Figure 5:
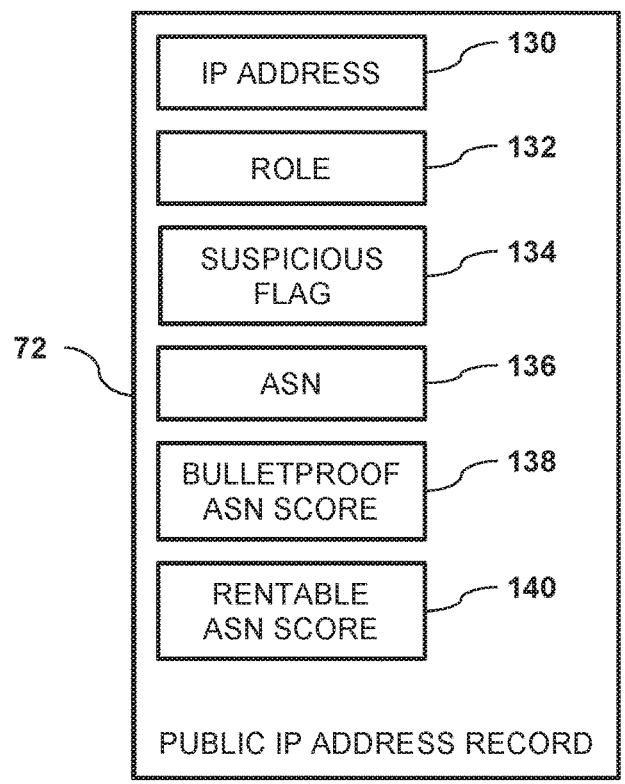
FIG. 5 is a block diagram showing an example of a public IP address record that the C&C attack detection system can generate for each of the remote nodes, in accordance with an embodiment of the present invention.

FIG. 5 is a block diagram showing information for a given remote node 38 that processor 60 can extract/determine/compute from transmissions 26 and store to a given public IP address record 72, in accordance with an embodiment of the present invention. Each given public IP address record 72 corresponds to a given public IP address 32, and comprises information such as:

A public IP address 130 corresponding to a given public IP address 32. As described supra, multiple public IP addresses can be assigned to any given remote node 38.

A role 132. As described in Appendix 1 hereinbelow, processor 60 can determine role 132 for the given public IP address 32 by analyzing a series of transmissions 26 from the local nodes to the given public IP address. Examples of roles 132 include, but are not limited to DNS servers, DMZ servers and content delivery servers (i.e., nodes in a content delivery network).

A suspicious flag 134 that indicates whether or not transmissions 26 to the given pubic IP address are considered to be suspicious.

An autonomous system number (ASN) 136. If the given public IP address belongs to a given autonomous system, then ASN 136 stores the number of the ASN. In some embodiments, processor 60 can store a null value if the given public IP address does not belong to any autonomous system.

A bulletproof ASN score 138 indicating whether or not the given ASN is bulletproof.

A rentable ASN score 140 indicating whether or not the given ASN is rentable.

Autonomous systems are respective collections of connected public IP addresses that are usually controlled by the same network operator. Each autonomous system (AS) has a corresponding autonomous system number (ASN). A description of ASNs and methods for their detection are described in U.S. Pat. No. 10,425,436.

In some embodiments, memory 62 can store an ASN table (not shown) that stores a relationship between ASNs and their respective public IP addresses 32. For example, the ASN table may comprise multiple records, each record comprising a given public IP address 32, a corresponding ASN number, and a corresponding ASN name (i.e., of the owner). In these embodiments, processor 60 can detect that a given transmission 26 is to an ASN by detecting that the given transmission is to a given public IP address in the ASN table. Likewise, processor 60 can detect that a given transmission 26 is from an ASN by detecting that the given transmission is from a given public IP address in the ASN table.

Examples of ASNs included rentable ASNs and bulletproof ASNs. A rentable ASN provides hosting services to others for a fee. For example, some Internet based retailers are reliable companies that provide hosting services, and may unknowingly host malicious activity hosted on their sites.

The rentable ASN score for a given ASN is an indication of the likelihood that the given ASN is rentable, and processor 60 can add, to whitelist 74, any public IP addresses 26 that (a) belong to a given ASN, and (b) have a rentable ASN score below a specified threshold. In other words, transmissions to/from rentable ASNs are more suspicious than transmissions to/from non-rentable ASNs (e.g., universities).

In a first embodiment, processor 60 can detect a rentable ASN by detecting that a given ASN hosts a number of domains that exceeds a domain threshold (e.g., 5) and have a high number of transmissions 26 to the public IP addresses owned by the given ASN (e.g., more than 1,000 transmissions in a 14 day period). In a second embodiment, processor 60 can identify a rentable ASN by detecting specific keywords (e.g., "telecommunication") in the name of the owner of the given ASN.

Bulletproof ASNs provide bulletproof hosting, which is a service provided by some domain hosting or web hosting firms that allows their customer considerable leniency in the types of material they upload and distribute. Bulletproof hosting is typically more expensive than regular hosting. For this reason, people usually don't host their site "accidentally" at a bulletproof hosting service.

The bulletproof ASN score is an indication of the likelihood that the given ASN is bulletproof, and processor 60 can add, to whitelist 74, any public IP addresses 32 that (a) belong to a given ASN, and (b) have a bulletproof ASN score below a specified threshold. In other words, transmissions to/from bulletproof ASNs are more suspicious than transmissions to/from non-bulletproof ASNs. Note that bulletproof ASNs are typically rentable ASNs.

In one embodiment, processor 60 can analyze web searches generated by local nodes 28 in order to filter out non-bulletproof ASN. For example, a large number of search results for a given ASN name (i.e., as described supra) can be a strong indicator that the ASN is not bulletproof. In another embodiment, positive values in the result count of a search comprising a given ASN name with certain other keywords (for example "bulletproof", "spam", "quota", "share", and "anonymous") can be a strong indicator that the corresponding ASN is bulletproof.

Malicious C&C Channel Detection

Figure 6:
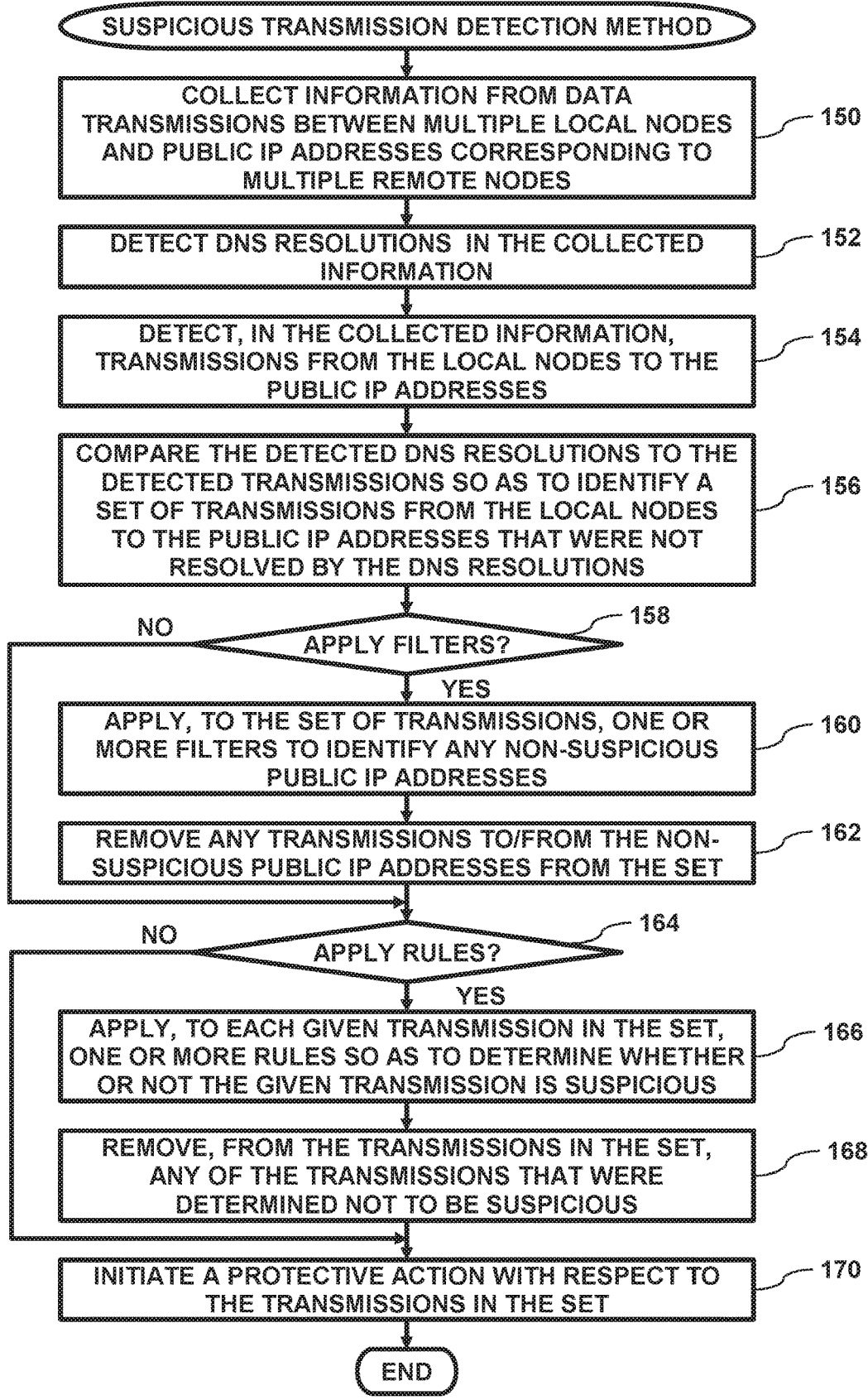
FIG. 6 is a flow diagram that schematically illustrates a method of analyzing the transmission records so as to detect suspicious C&C transmissions to fixed Internet Protocol (IP) addresses, in accordance with an embodiment of the present invention.

FIG. 6 is a flow diagram that schematically illustrates a method of detecting suspicious transmissions 26 so as to detect a given C&C channel 30 to a given fixed public IP address 32, in accordance with an embodiment of the present invention.

In step 150, processor 60 uses embodiments described supra to collect, via NIC 64, information from data transmissions 26 between local nodes 28 and public IP addresses 38 corresponding to multiple remote nodes 38. In some embodiments, processor 60 can collect the information by querying firewall log 58. As described supra, processor 60 can store the collected information to transmission records 68.

In step 152, processor 60 analyzes transmission records 68 to detect transmissions 26 that comprise DNS resolutions. As described supra, each transmission 26 has a corresponding transmission record 68. Therefore, in embodiments described herein, processor 26 analyzes transmissions 26 by analyzing transmission records 68.

To detect a given DNS resolution, processor 60 can detect a first transmission 26 from a given local node 28 to a given fixed public IP address 32 and a subsequent second transmission 28 from the given remote node to the given local node, wherein the first transmission comprises a User Datagram Protocol (i.e., as indicated by protocol 88) request, and wherein the second transmission comprises a User Datagram Protocol (UDP) response. In some embodiments, processor 60 can update the DNS flag in the transmission records for the first and second transmissions to indicate the DNS request and resolution.

In one embodiment, processor 60 can detect the UDP protocol in a given transmission 26 based on information received from an endpoint agent (not shown) executing on a given local node 28. In another embodiment, firewall 54 can detect by performing deep packet inspection on the data packets in a given transmission 26, and convey a notification to the given local node upon detecting (i.e., based on the deep packet inspection) the UDP protocol in the given transmission.

In step 154, processor analyzes transmission records 68 to detect transmission from local nodes 28 to public IP addresses 32. In some embodiments, processor 60 can detect these transmissions by detecting transmission records 68 having destination IP addresses 84 that are not in any subnet of private data network 36.

In step 156, processor 60 compares the detected DNS resolutions (i.e., from step 152) to the detected transmissions (i.e., from step 154) so as to detect a set of transmissions 26 that (a) were from local nodes 28 to public IP addresses 32 and (b) were not resolved by the DNS resolutions. The resulting set of transmissions is referred to herein as transmissions to fixed public IP addresses 32.

In some embodiments, processor 60 can use the following steps to detect transmissions 26 to fixed public IP addresses 32 (i.e., transmissions 26 to public IP addresses 32 that do not use DNS resolutions to identify the public IP addresses):

1. Select transmissions 26 that were either DNS requests (i.e., as indicated by DNS flag 96) or whose respective protocol 88 is HTTP or SSL.
2. Create a dataset D of "IPs with domain resolutions" as follows:
   a. Identify all Public IP addresses 32 in the past X days that had a DNS resolution (i.e., as indicated by DNS flag 96 in the transmission records). In embodiments described herein, X can be a specified number of days such as 7, 10, 14 or 17.
   b. Identify all Public IP addresses 32 in the past X days that were destinations for transmissions 26 comprising a given Internet domain 46 in the "host" field. In some embodiments, processor 60 can store the Internet domain and host field data for a given transmission 26 to protocol data 90 in the corresponding transmission record 68.
   c. Identify all public IP addresses 32 that were destinations in the past X days for transmissions 26 comprising SSL (i.e., as indicated by protocol 88) with an explicit domain 46 (i.e., protocol data 90 indicates either SNI or a certificate subject in an SSL handshake response).
3. For a given transmission 26 from a given local node 28 to a given public IP 32 and whose protocol 88 is either HTTP or SSL:
   a. If destination IP address 84 in the given transmission is in D, ignore the given transmission.
   b. If protocol 88 is HTTP, and protocol data 90 indicates that the "host" field contains an Internet domain, ignore the given transmission.
   c. If protocol 88 is SSL, and protocol data 90 indicates an explicit domain (e.g., SNI or a certificate subject in an SSL handshake response), ignore the given transmission.
   d. If role 112 of the given local node indicates a proxy, ignore the given transmission. In other words, processor 60 ignores transmissions 26 from any proxies to any public IP address 32.
   e. Otherwise, flag the given transmission as "fixed IP".
4. For a given transmission 26 from a given local node 28 to a given public IP address 32 and show protocol 88 not HTTP or SSL (on top of UDP or TCP):
   a. If the public IP address belongs to D, ignore the given transmission.
   b. If the protocol is DNS, ignore the given transmission.
   c. If role 112 of the given local node indicates a proxy, ignore the given transmission.
   d. Otherwise, flag the given transmission as "fixed IP".

In an alternative embodiment, processor 60 can create dataset D (i.e., of "IPs with domain resolutions", as described in step 2 hereinabove_) by analyzing logs 55, 57 and 59.

In step 158, processor 60 determines whether or not to apply any filters 76 to the set of transmissions 26 that the processor identified in step 156. The filters are described in Appendix 1 hereinbelow.

In embodiments where one or more filters 76 are applied, processor 60 applies the filter(s) to the set of transmissions in step 160 so as to identify any non-suspicious pubic IP addresses 32, and in step 162, the processor removes, from the set, any transmissions 26 to/from the identified public IP addresses. In some embodiments, filters 76 add public IP addresses 32 to whitelist 74, and in step 162, processor 60 removes, from the set, any transmissions 26 to/from the public IP addresses in whitelist 74.

In step 164, processor 60 determines whether or not to apply any rules 78 to the transmissions currently in the set. The rules are described in Appendix 2 hereinbelow.

In embodiments where one or more rules 78 are applied, processor 60 applies the rule(s) to each given remaining transmission in step 166 so as to determine whether or not the given transmission is suspicious, and in step 168, the processor removes, from the set, any of the transmissions that were determined not to be suspicious.

Finally, in step 170, processor 60 initiates a preventive action with respect to the transmissions that are currently in the set, and the method ends. In embodiments of the present invention transmissions 26 that are currently in the set comprise transmissions 26 that are suspected of using malicious C&C channels 30 to (fixed) public IP addresses 32.

Examples of preventive actions that processor 60 can initiate with respect from a given transmission 26 from a given local node 28 to a given public IP address 32 include, but are not limited to:

Presenting, on UI device 66, a message (e.g., an alert) indicating the given local node and/or the given public IP address.

Conveying, to firewall 54, an instruction to restrict or prevent transmissions 26 from the given local node to any public IP address 32 and/or any other local node 28.

Conveying, to firewall 54, an instruction to restrict or prevent transmissions 26 from any given local node to the given public IP address.

Returning to step 164, if no rules are to be applied to the current set of transmissions 26, then the method continues with step 170. Returning to step 158, if no filters are to be applied to the (initial) set of transmissions, then the method continues with step 164.

Appendix 1: Filters

A first example of a given filter 76 is a filter that filters out transmissions 26 from local nodes 28 to public IP addresses 32 that are in demilitarized zone (DMZ) subnet 40. DMZ subnets typically comprise physical or logical subnetworks that contain and expose external-facing services (e.g., a web server) to an untrusted network such as Internet 42. The purpose of a DMZ subnet is to add an additional layer of security to computing facility 22, since remote nodes 38 can access only remote nodes 38B in the DMZ subnet, while local nodes 28 are protected by firewall 54.

Characteristics of DMZ subnets include:

Transmissions 26 from local nodes 28 to remote nodes 38B are considered benign.

Public IP addresses 32B are reachable from either local nodes 28 or remote nodes 38A.

Local nodes 28 typically access public IP addresses 32B via fixed IP access (i.e., no DNS resolution).

Remote nodes 38B and local nodes 28 typically communicate with each other. In other words, remote nodes 38B typically transmit transmissions 26 to local nodes 28, and vice versa.

DMZ subnets typically comprise a set of public IP addresses that are associated with network 36 (i.e., the entity that owns network 36 also owns the IP addresses in the DMZ subnets. In some embodiments, the set of public IP addresses may comprise one or more subsets of consecutive public IP addresses. In other embodiments (e.g., if the public IP addresses are managed by a cloud computing provider), the DMZ subnet may comprise a set of non-consecutive public IP addresses.

In some embodiments, processor 60 can identify public IP addresses 32B (i.e., in the DMZ subnet) by performing the following steps:

1. Collect transmissions 26 between local nodes 28 and public IP addresses 32B.
2. For each given public IP address 32 in transmissions 26 from local nodes 28 to the public IP addresses, count the number of days (out of the last X days) in which at least one local node 28 accessed (i.e., transmitted a given transmission 26) to the given public IP address. A described supra, X can be a specified number of days such as 7, 10, 14 or 17.
3. For each given public IP address 32 in transmissions 26 from the public IP addresses to local nodes 28, count the number of days (out of the last X days) in which at least one of the public IP addresses accessed to any of the local nodes. In some embodiments, processor 60 can detect a given local node 28 successfully accessing a given public IP address by detecting a communication session between the given local node and the given public IP address, wherein the communication session comprises at least one transmission 26 from the given local node to the given public IP address and at least one transmission 26 from the given public IP address to the given public IP address.
4. Generate the following table Table1:

| External_IP | Outgoing_Traffic_Day_Count | Incoming_Traffic_Day_Count | Subnet_24 |
|---|---|---|---|
| 35.78.33.1 | 8 | 7 | 35.78.33.0/24 |
| 35.78.33.2 | 5 | 6 | 35.78.33.0/24 |
| 35.78.99.1 | 1 | 2 | 35.78.99.0/24 |
| 35.78.99.2 | 2 | 3 | 35.78.99.0/24 |

5. Filter Table1 to retain entries meeting the following criteria
   Outgoing_Traffic_Day_Count>Threshold1
   Incoming_Traffic_Day_Count>Threshold2
      Examples for Threshold1 and Threshold2 are 2, 3, 4 or 5 (i.e., when X=14).
6. Generate Table2 upon applying the filters:

| Subnet_24 | Traffic_Value (i.e., External IPs with periodic 2-way traffic) |
|---|---|
| 35.78.33.0/24 | 2 |
| 35.78.99.0/24 | 0 |

7. Mark any Subnet_24 having Traffic_Value>Threshold3.
   Examples for Threshold3 are 0, 1 or 2.
8. Any marked subnet is suspected of being a DMZ subnet. Therefore, processor 60 can the public IP addresses in any marked subnet to whitelist 74.

A second example of a given filter 76 is a Content Delivery Network (CDN) filter that filters out transmissions 26 from local nodes 28 to public IP addresses 32 that belong to CDNs. A CDN is a system of distributed servers that deliver pages and other web content to a user, based on the geographic locations of the user, the origin of the webpage and the content delivery server. The CDN filter comprises a set of Public IP addresses for nodes of one or more CDNs that processor 60 can add to whitelist 74.

A third example of a given filter 76 is a super-benign ASN filter that filters out transmissions 26 from local nodes 28 to public IP addresses 32 that belong to "super-benign" ASNs. Some entities (e.g., individuals, organizations and companies) own their own sets of ASNs that are reserved for internal use, and do not provide hosting (i.e., not rentable) services via these ASNs. In this filter, processor 60 can add, to whitelist 74, public IP addresses of ASNs that are identified as "super-benign".

A fourth example of a given filter 76 is a pinger/scanner filter that filters out transmissions 26 from local nodes 28 to public IP addresses 32 that belong to pingers or scanners. A pinger is a computer (e.g., a given local node 28) that "pings" a given public IP address 32 (e.g., by transmitting to destination port "0") in order to determine a status of the remote node corresponding to the given IP address. For example, a pinger can determine whether or not the remote node is "live" (i.e., connected to Internet 42). A scanner is a computer (e.g., a given local node 28) that scans one or more ports 44 on remote nodes 38 (i.e., having one or more respective public IP addresses 32) in order to check the statuses of services (e.g., a database server) at the public IP addresses that use those ports.

Since scanners and pingers typically transmit to specific lists of Public IP addresses, once processor 60 detects that a given local node is a scanner or a pinger (and updates role 112 accordingly), the processor can analyze transmission records 68 to identify the destination IP addresses in transmissions from the given local node, and add those destination IP addresses to whitelist 74.

To detect that a given local node 28 is a pinger or a scanner, processor 60 can perform the following steps:
1. Identify, during a specified number of days (e.g., 14, 18, 21, 25), transmissions 26 from a given local node 28 to public IP addresses 32.
2. Identify a first number (SucessfulNum) of IP addresses 32 that had successful transmissions 26 (i.e., not all the transmissions failed) from the given local node and a second number (FailedNum) of the public IP addresses that had failed transmissions 26 (i.e., all the transmissions failed) from the given node. Successful and failed transmissions 26 using TCP/IP can be identified by ACK responses (or the lack of one).
3. To classify the given local node as a pinger, processor 60 detects the following conditions:
   a. The destination port for the identified transmissions is "0".
   b. SuccessfulNum>ThresholdS1 (e.g., −1, 0, 1, 2).
   c. FailedNum>ThresholdF1 (e.g., −1, 0, 1, 2).
   d. (SuccessfulNum+FailedNum)>ThresholdC1 (e.g., 30, 40, 60, 70).
4. To classify the given local node as a scanner, processor 60 detects the following conditions:
   a. The destination port for the identified transmissions is "0".
   b. SuccessfulNum>ThresholdS1 (e.g., −1, 0, 1, 2).
   c. FailedNum>ThresholdF1 (e.g., −1, 0, 1, 2).
   d. (SuccessfulNum+FailedNum)>ThresholdC1 (e.g., 10, 15, 20, 25, 30).

A fifth example of a given filter 76 is a number of sources filter. For each given public IP address 32, processor 60 computes a count of distinct local nodes 28 that transmitted at least one transmission 26 to the given public IP address. If, during a specified time period (e.g., 21 days), the number of local nodes that transmitted at least one transmission 26 to a given public IP address 32 is greater than a specified threshold (e.g., 3, 4, 5 or 6), then processor 60 can add the given public IP address to whitelist 74.

A sixth example of a given filter 76 is a ports filter. For each given public IP address 32, processor 60 computes a count of distinct port numbers 86 in the transmissions to the given public IP address. If, during the specified time period (e.g., 21 days), the number of ports 44 were destination ports 86 in transmissions 26 to a given IP address 32 is greater than a specified port threshold (e.g., 2, 3, 4), then processor 60 can add the given public IP address to whitelist 74.

A seventh example of a given filter 76 is an active days filter. For each given public IP address 32, processor 60 computes a count of distinct days (i.e., based on time 80) having transmissions to the given public IP address. If, during a specified time period (e.g., 21 days), the number of distinct days that any local node 28 transmitted at least one given transmission 26 to a given public IP address 32 is less than a specified days threshold (e.g., 2, 3, 4), then processor 60 can add the given public IP address to whitelist 74.

An eighth example of a given filter 76 is an active ratio filter. In some embodiments, processor 60 can compute the active ratio for a specified time period (e.g., 14 days) by computing the following:
A indicates number of distinct days a given local node 28 transmitted a given transmitted a given transmission 26 to a given public IP address 32
B indicates a number of distinct days the given local node transmitted transmissions 26 during at least a specified number of distinct daily hours (e.g., 2, 3, 4). In embodiments of the present invention, the distinct daily hours are aggregated for all the days. In other words, if one day has transmissions 26 during 10:01-14:00, and another day has transmissions during 11:01-16:00, there six distinct daily hours (i.e., 10:01-11:00, 11:01-12:00, 12:01-13:00, 13:01-14:00, 14:01-15:00 and 15:01-16:00).
Active Ratio=A/B.

If the Active Ratio for a pair comprising a given local node 28 and a remote IP address 32 is less than a specified ratio threshold (e.g., 0.7, 0.75, 0.8, 0.85), then processor 60 can add the given public IP address to whitelist 74.

A ninth example of a given filter 76 is an active hours filter. If, during a specified time period (e.g., 14 or 21 days), the number of distinct daily hours (as described supra in the eighth example) that any local node 28 transmitted at least one given transmission 26 to a given public IP address 32 is less than a specified hours threshold (e.g., 6, 7, 8, 9), then processor 60 can add the given public IP address to whitelist 74.

Appendix 2: Rules

In embodiments of the present invention, rules 78 may comprise positive indication rules 78 and negative indication rules 78. A given positive rule 78 is more suspicious when true, and a given negative rule 78 is more suspicious when false. In some embodiments, processor 60 can apply each of the rules to each given transmission 26 (i.e., from a given local node 28 to a given destination IP 32) in order to compute a score for the given transmission.

In some embodiments, processor 60 can compute the score applying a weight (e.g., +1 for each positive rule 78 that is true, and −1 for each negative rule 78 that is false) to each of the rules when applied to the given transmission. Therefore, positive rules that are false and negative rules that are true do not impact the scores.

The rules described hereinbelow list conditions for the rules to be classified as true. If any of the conditions for a given rule 78 are not met, processor 60 classifies the given rule as false.

Examples of positive rules (i.e., for a given transmission 26 from a given local node 28 to a given remote node 38) include:
1. A first given positive rule 78 is true if processor 60 detects that protocol 88 for the given transmission matches a given protocol in a specified list of protocols (e.g., NTP, SNTP), and that the total volume (i.e., amount of data) of the transmissions between the given local node and the given remote note using the given protocol does not match a specified range (i.e., for the protocol) during a specified time period. For example, the expected daily volume for protocol SNMP, may be less than a threshold such as 100 KB or 200 KB.
2. A second given positive rule 78 is true if processor 60 detects that protocol 88 for the given transmission is in a specified list of protocols (e.g., NTP, SNTP) and the total volume of the transmissions in the session (i.e., between the given local node and the given remote node, as indicated by session ID 10) comprising the given transmission using the protocol does not match a specified session threshold (i.e., for the protocol). For example, the expected session volume for protocol SNMP may be less than a threshold such as 10 KB or 15 KB.

3. A third given positive rule 78 is true if processor 60 detects protocol 88 for the given transmission is in a specified list of protocols and the total number of transmissions 26 using this protocol to the given destination IP is not within a specified range.

For example, the third given positive rule is true if processor 60 detects the given source node transmitting more than 1,000 DNS requests to the given remote node during a 24 hour period. This is because it is extremely unlikely that 1,000 DNS requests can be manually generated during a given workday (e.g., 10 hours).

4. A fourth given positive rule 78 is true if processor 60 detects that the destination port number in the given transmission is a non-standard port. For example, transmissions with destination port numbers 86 that do not belong to the network mapper (NMAP) list of ports (e.g., any port number>1024). Processor 60 can detect a non-standard port by comparing the destination port number to a list of standard port numbers. In some embodiments, the list may comprise one or more ranges of destination port numbers 5. A fifth given positive rule 78 is true if processor 60 detects that the geo-location in the given transmission is rare. A given geo-location 94 may be considered rare if the number of transmissions 26 to the given geo-location during a specified number of days (e.g., 14, 18, 21) does not exceed a specified threshold (e.g., 8, 9, 10).

6. A sixth given positive rule 78 is true if processor 60 detects that the destination IP address in the given transmission belongs to given ASN 136, and the ASN is rare. A given ASN 136 may be considered rare if the number of transmissions 26 to the public IP address for the given ASN during a specified number of days (e.g., 15, 18, 21) does not exceed a specified threshold (e.g., 8, 9, 10).

7. A seventh given positive rule 78 is true if processor 60 detects that the destination IP address in the given transmission belongs to given ASN 136 whose bulletproof ASN score indicates that the given ASN is likely to be a bulletproof ASN.

8. An eighth given positive rule 78 is true if processor 60 detects that the destination IP address in the given transmission is new. Processor 60 can classify a given destination IP address 32 as new if there were no transmissions 26 to the given IP address within the past X (e.g., 15, 18, 21) days. Processor 60 can detect a given day/date for each transmission 26 based on time 80. In some embodiments processor 69 can that the given destination IP address is new by comparing the times in transmissions 26 to a specified threshold date, and detecting at least one transmission 26 to the given public IP address subsequent to the specified threshold date.

9. A ninth given positive rule 78 is true if processor 60 receives a notification that firewall 54 does not recognize protocol 88 in the given transmission. In an alternative embodiment, processor 60 may only receive a notification from firewall 54 only if the firewall recognizes protocol 88. In this embodiment, this rule is true if processor 60 does not receive the notification.

10. A tenth given positive rule 78 is true if processor 60 detects that the destination port number in the given transmission does not match the protocol (i.e., of the given transmission) recognized by firewall 54 (i.e., and reported to the processor). In a first example, this rule is true if the protocol for the given transmission is HTTP and the destination port number for the given transmission is 123. In some embodiments, memory 62 store a list (not shown) of valid ports 44 the protocol in the given transmission, and determine that the given positive rule is true by comparing the destination port number to the list and not detecting a match.

In a second example, the tenth given positive rule 78 is true if processor 60 detects a Layer-4 protocol mismatch by detecting that the protocol in the given transmission is TCP and the destination port number in the given transmission is 53.

11. An eleventh given positive rule 78 is true if processor 60 detects that the destination IP address for the given transmission belongs to a cloud provider and that the datacenter (i.e., the cloud provider) hosting the destination IP address hosts less than a specified threshold number (e.g., 10, 12, 14) of destination IP addresses 32. In other words, data centers and cloud providers having higher numbers of public IP addresses contacted by computing facility 22 (e.g., by local nodes 28) are less suspicious than those having fewer public IP addresses that were contacted by the computing facility.

To evaluate this rule, memory 62 can store a table (not shown) of public IP addresses and their associated datacenter, and processor 60 can compare the destination IP address of the given transmission to the public IP addresses in the table, and upon detecting a match to a given public IP address associated with a given datacenter, the processor can determine (i.e., from the table) the number of public IP addresses hosted by the given datacenter.

Examples of negative rules (i.e., for a given transmission 26 from a given local node 28 to a given remote node 38) include:

1. A first given negative rule 78 is true if processor 60 detects that protocol 88 for the given transmission is in a specified list of protocols (e.g., NTP, SNTP) and the total volume of the transmissions using the protocol matches a specified range (i.e., for the protocol) during a specified time period. For example, the expected daily volume for protocol SNMP, may be less than a threshold such as 20 KB or 40 KB.

2. A second given negative rule 78 is true if processor 60 detects that protocol 88 for the given transmission is in a specified list of protocols (e.g., NTP, SNTP) and the total volume of the transmissions in the session (i.e., comprising the given local and remote nodes as indicated by session ID 10) comprising the given transmission using the protocol matches a specified session range (i.e., for the protocol). For example, the expected session volume for protocol SNMP may be less than a threshold such as 10 KB or 15 KB.

3. A third given negative rule 78 is true if processor 60 detects that the given local node is attempting to access (i.e., in a subset of transmissions 26 from the given local node to the given remote node), on the remote node for the given remote IP address, more than a specified number (e.g., 1, 2, 3) of ports 44 that are not commonly used for external traffic. This is less suspicious since, from an attacker's perspective, these non-outbound ports (e.g., port numbers 445, 139, 1, 111, 138, 137) are typically closed for external traffic. In some embodiments, memory 62 may store a list (not shown) of ports 44 commonly used for external traffic, and processor 60 can that a given port is not commonly used for external traffic by comparing the given port to the list and not finding a match.

4. A fourth given negative rule 78 is true if the geo-location in the given transmission is common. A given geo-location 94 may be considered common if the number of transmissions 26 to the given location during a specified number of days (e.g., 14, 18, 21) exceeds a specified threshold (e.g., 600, 800, 1000).

5. A fifth given negative rule 78 is true if the destination IP address in the given transmission belongs to given ASN 136, and the ASN is common. A given ASN 136 may be considered common if the number of transmissions 26 to the public IP address for the given ASN during a specified number of days (e.g., 15, 18, 21) exceeds a specified threshold (e.g., 800, 1000, 1200).

6. A sixth given negative rule 78 is true if the destination IP address in the given transmission belongs to given ASN 136 whose rentable ASN score indicates that the given ASN is not a rentable ASN.

7. A seventh given negative rule 78 is true if the role of at least one local node 28 transmitting to the given destination IP address is a "proxy" (i.e., a proxy server) and the destination port number for the given transmission is 53.

In one embodiment, memory 62 can store a list (not shown) of local nodes 28 whose respective role 112 is "proxy", and processor 60 can evaluate this rule by analyzing all of the transmissions to the given destination node (i.e., a given public IP address) within a specified number (e.g., 7) of days. If processor 60 (a) identifies, from the transmissions, at least one transmission 26 to the given destination node from any local node 28 whose respective role 112 is "proxy", and (b) detects that the destination port number in the given transmission is "53", then the processor can determine (i.e., via iterative DNS) that role of the given source node (i.e., for the given transmission) is (also) "proxy", and evaluate this rule as true (i.e., the given transmission is likely to be legitimate DNS traffic).

8. An eighth given negative rule 78 is true if processor 60 determines that all of the transmissions within a specified time period (such as seven days prior to the given transmission) to the given destination node (i.e., a given public IP address) are from one or more local nodes 26 whose role 112 is a "pinger".

9. A ninth given negative rule 78 is true if processor 60 determines that the given public IP address belongs to a mail server (i.e., via role 132), and that during a specified time period prior to the given transmission (e.g., the past seven days), there were one or more transmissions 26 (a) to the given destination node (i.e., a given public IP address), and (b) having respective destination port numbers that are email port numbers. For example, the following may be a list of email ports for mail servers in an organization: {'POP3': 110, 'POP3 over SSL': 995, 'IMAP': 143, 'IMAP over SSL': 993, 'SMTP': 25, 'SMTP over SSL': 587}

10. A tenth given negative rule 78 is true if processor 60 detects, from a first given local node 28 to the given public IP address (i.e., in the given transmission), a given transmission 26 whose protocol 88 is SNMP, and detects, from a second given local node 28 to the given public IP address, a given transmission 26 whose protocol 88 is Internet Control Message Protocol (ICMP). If this rule is true, then the given public IP address and C&C attack detection system 24 may belong to the same entity (e.g., an individual, a company or an organization).

As described supra:

Processor 60 can apply one or more filters 76 to transmissions 26.

Processor 60 can then apply one or more rules 78 to each of the remaining filtered transmissions (i.e., the transmissions that were not filtered).

Processor 60 can compute a score by applying a weight of +1 to each positive rule 78 that is true and applying a weight of −1 to each negative rule 78 that is false.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a computer system against malicious command and control (C&C) channels to fixed Internet Protocol (IP) addresses, the method comprising:

collecting, by a processor, information extracted from data traffic transmitted between multiple local nodes on a private data network and publicIP addresses corresponding to multiple remote nodes on a public data network;

detecting, in the collected information, Domain Name System (DNS) resolutions requested by local nodes, each DNS resolution identifying a local node requesting a resolution with respect to a uniform resource identifier (URI) and a publicIP address corresponding to the URI received by the local node in response to the requesting the resolution;

creating a dataset comprising first public IP addresses that were resolved by the DNS resolutions and received by the local nodes in the DNS resolutions detected in the information extracted from the data traffic;

detecting, in the collected information, transmissions from the local nodes that are addressed to second public IP addresses at respective times;

comparing the second publicIP addresses to the dataset comprising the first publicIP addresses to identify any of the detected transmissions that are addressed to any of the second publicIP addresses as the fixed IP addresses that are not included in the dataset comprising the first public IP addresses that were resolved previously by the DNS resolutions as suspicious transmissions; and initiating a protective action with respect to at least some of the identified suspicious transmissions.

2. The method according to claim 1, and further comprising:

analyzing the detected transmissions to identify a subnet of the public data network containing a subset of the public IP addresses that were not resolved by the DNS resolutions but belong to a demilitarized zone (DMZ) subnet associated with the private data network; and refraining from the protective action with respect to any of the identified transmissions to the public IP addresses in the identified subnet.

3. The method according to claim 1, and further comprising identifying a given public IP address that belongs to an autonomous system reserved for internal use by an entity, and refraining from the protective action with respect to any of the identified transmissions to the identified given public IP address.

4. The method according to claim 1, and further comprising identifying a given public IP address that belongs to a content delivery network, and refraining from the protective action with respect to any of the identified transmissions to the identified given public IP address.

5. The method according to claim 1, and further comprising:
analyzing the detected transmissions to identify a given local node that pinged a given public IP address to determine a status of the corresponding remote node; and
refraining from the protective action with respect to any of the identified transmissions to the given public IP address.

6. The method according to claim 1, and further comprising:
analyzing the detected transmissions to identify a given local node that scanned one or more ports on a given remote node to determine one or more respective statuses of services provided by the given remote node at the one or more ports; and
refraining from the protective action with respect to any of the identified transmissions to a given public IP address corresponding to the given remote node.

7. The method according to claim 1, and further comprising computing, for a given public IP address, a count of distinct local nodes that transmitted at least one given detected transmission to the given public IP address, comparing the computed count to a specified range, and refraining from the protective action with respect to any of the identified transmissions to the given public IP address upon detecting that the computed count is greater than a specified threshold.

8. The method according to claim 1, wherein each given detected transmission to one of the public IP addresses comprises a destination port number, and further comprising computing, for a given public IP address, a count of distinct destination port numbers in the detected transmissions to the given public IP address, comparing the computed count to a specified threshold, and refraining from the protective action with respect to any of the identified transmissions to the given public IP address upon detecting that the computed count is greater than the specified threshold.

9. The method according to claim 1, and further comprising computing, based on the respective times, a count of distinct days having at least one given detected transmission to a given public IP address, comparing the determined count to a specified threshold, and refraining from the protective action with respect to any of the identified transmissions to the given public IP address upon detecting that the computed count is less than the specified threshold.

10. The method according to claim 1, and further comprising computing, based on the respective times, a first count of distinct days having at least one given detected transmission from a given local node to a given public IP address, computing a second count of days having at least one given detected transmission from the given local node during at least a specified number of distinct hours, computing a ratio of the first count to the second count, comparing the ratio to a threshold, and refraining from the protective action with respect to any of the identified transmissions to the given public IP address upon detecting that the ratio is less than the specified threshold.

11. The method according to claim 1, and further comprising computing, based on the respective times, a count of distinct hours having at least one given detected transmission to a given public IP address, comparing the determined count to a specified threshold, and refraining from the protective action with respect to any of the identified transmissions to the given public IP address upon detecting that the computed count is less than the specified threshold.

12. The method according to claim 1, and further comprising determining a protocol of a given detected transmission to a given public IP address, computing a total volume of data in the detected transmissions to the given public IP address, comparing the computed volume to a specified range for the determined protocol, and refraining from the protective action with respect to the given detected transmission upon detecting that the computed total volume is not within the specified range.

13. The method according to claim 1, and further comprising determining a protocol of a given detected transmission to a given public IP address, computing a count of the detected transmissions in a session comprising the given detected transmission, comparing the computed count to a specified range for the determined protocol, and refraining from the protective action with respect to the given detected transmission upon detecting that the computed count is not within the specified range.

14. The method according to claim 1, and further comprising determining a protocol of a given detected transmission to a given public IP address, identifying the determined protocol in a specified list of protocols, computing a count of the detected transmissions to the given public IP address, comparing the computed count to a specified range for the determined protocol, and refraining from the protective action with respect to the given detected transmission upon detecting that the computed count is within the specified range.

15. The method according to claim 1, and further comprising determining a destination port number of a given detected transmission, comparing the determined destination port number to specified list of port numbers, and refraining from the protective action with respect to the given detected transmission upon detecting that the determined destination port number is in the specified list.

16. The method according to claim 1, and further comprising determining a geo-location of a given destination IP address in a given detected transmission, computing a count of the detected transmissions to any of given destination IP addresses having the same geo-location, comparing the computed count to a specified threshold, and refraining from the protective action with respect to the given detected transmission upon detecting that the computed count is less than the specified threshold.

17. The method according to claim 1, and further comprising determining that a given destination IP address in a given detected transmission belongs to an autonomous system, computing a count of the detected transmissions to the given destination IP address, comparing the computed count to a specified threshold, and refraining from the protective action with respect to the given detected transmission upon detecting that the computed count exceeds the specified threshold.

18. The method according to claim 1, and further comprising determining that a given destination IP address in a given detected transmission belongs to an autonomous system, determining that the autonomous system is not bulletproof, and refraining from the protective action with respect to the given detected transmission.

19. The method according to claim 1, and further comprising determining a given destination IP address in a given detected transmission, identifying a subset of the detected transmissions to the given destination IP address, identifying, based on the respective times, a most recent transmission in the subset, determining a date for the most recent transmission, comparing the date to a specified threshold date, and refraining from the protective action with respect to the given detected transmission upon detecting that the determined date is after the specified threshold date.

20. The method according to claim 1, wherein a given detected transmission comprises a given protocol, and further comprising receiving, from a firewall, a notification that the firewall recognizes the given protocol, and refraining from the protective action with respect to the given detected transmission.

21. The method according to claim 1, wherein a given detected transmission comprises a given protocol and a given destination port number, and further comprising comparing the destination port number to a list of valid destination port numbers for the given protocol, and refraining from the protective action with respect to the given detected transmission upon detecting the given destination port number in the list.

22. The method according to claim 1, wherein a given detected transmission comprises a given public IP address, and further comprising determining a number of the public IP addresses hosted by a datacenter hosting the given public IP address, and refraining from the protective action with respect to the given detected transmission upon detecting that the determined number is less than a specified threshold.

23. The method according to claim 1, wherein each given detected transmission of given detected transmissions from a given local node to a given remote node comprises a given protocol and a given destination port number, and further comprising comparing destination port numbers in the given detected transmissions to a list of standard port numbers, computing a count of the compared destination port numbers that were not in the list, and refraining from the protective action with respect to the given detected transmissions upon detecting that the computed count exceeds a specified threshold.

24. The method according to claim 1, and further comprising determining that a given destination IP address in a given detected transmission belongs to an autonomous system, determining that the autonomous system is not rentable, and refraining from the protective action with respect to the given detected transmission.

25. The method according to claim 1, and further comprising determining that a given local node is a proxy server, and refraining from the protective action with respect to any given detected transmission from the given local node.

26. The method according to claim 1, and further comprising identifying one or more of the local nodes as pingers, determining that all of the transmissions to a given destination IP address are from the one or more identified local nodes, and refraining from the protective action with respect to any given detected transmission to the given destination IP address.

27. The method according to claim 1, and further comprising determining that a given destination IP address in a given detected transmission corresponds to a mail server, and refraining from the protective action with respect to the given detected transmission.

28. The method according to claim 1, and further comprising detecting a first given detected transmission to a given public IP address, detecting a second given detected transmission to the given public IP address and whose protocol comprises Simple Network Management Protocol, detecting a third given detected transmission to the given public IP address and whose protocol comprises Internet Control Message Protocol, and refraining from the protective action with respect to the first given detected transmission.

29. The method according to claim 1, wherein the URI comprises a domain, and wherein the each DNS resolution identifies the local node requesting the resolution with respect to the domain and the public IP address corresponding to the domain.

30. An apparatus for protecting a computer system against malicious command and control (C&C) channels to fixed Internet Protocol (IP) addresses, the apparatus comprising:
 a network interface controller (NIC); and
 at least one hardware processor configured:
  to collect, via the NIC, information extracted from data traffic transmitted between multiple local nodes on a private data network and public Internet Protocol (IP) addresses corresponding to multiple remote nodes on a public data network,
  to detect, in the collected information, Domain Name System (DNS) resolutions requested by local nodes, each DNS resolution identifying a local node requesting a resolution with respect to a uniform resource identifier (URI) and a publicIP address corresponding to the URI received by the local node in response to the requesting the resolution;
  to create a dataset comprising first publicIP addresses that were resolved by the DNS resolutions and received by the local nodes in the DNS resolutions detected in the information extracted from the data traffic,
  to detect, in the collected information, transmissions from the local nodes that are addressed to second public IP addresses at respective times,
  to compare the second publicIP addresses to the dataset comprising the first public IP addresses to identify any of the detected transmissions that are addressed to any of the second public IP addresses as the fixed IP addresses that are not included in the dataset comprising the first publicIP addresses that were resolved previously by the DNS resolutions as suspicious transmissions, and
  to initiate a protective action with respect to at least some of the identified suspicious transmissions.

31. A computer software product for protecting a computing system against malicious command and control (C&C) channels to fixed Internet Protocol (IP) addresses, the product comprising a non-transitory computer-readable medium storing program instructions, when read by a computer, cause the computer:
 to collect information extracted from data traffic transmitted between multiple local nodes on a private data network and public Internet Protocol (IP) addresses corresponding to multiple remote nodes on a public data network;
 to detect, in the collected information, Domain Name System (DNS) resolutions requested by local nodes, each DNS resolution identifying a local node requesting a resolution with respect to a uniform resource identifier (URI) and a publicIP address corresponding to the URI received by the local node in response to the requesting the resolution;
to create a dataset comprising first publicIP addresses that were resolved by the DNS resolutions and received by the local nodes in the DNS resolutions detected in the information extracted from the data traffic,
to detect, in the collected information, transmissions from the local nodes that are addressed to second public IP addresses at respective times,
to compare the second publicIP addresses to the dataset comprising the first publicIP addresses to identify any of the detected transmissions that are addressed to any of the second publicIP addresses as the fixed IP addresses that are not included in the dataset comprising the first public IP addresses that were resolved previously by the DNS resolutions as suspicious transmissions, and
to initiate a protective action with respect to at least some of the identified suspicious transmissions.

* * * * *